United States Patent [19]
Brown

[11] Patent Number: 5,794,219
[45] Date of Patent: Aug. 11, 1998

[54] METHOD OF CONDUCTING AN ON-LINE AUCTION WITH BID POOLING

[75] Inventor: Stephen J. Brown, Mountain View, Calif.

[73] Assignee: Health Hero Network, Inc., Mountain View, Calif.

[21] Appl. No.: 603,131

[22] Filed: Feb. 20, 1996

[51] Int. Cl.$^6$ .................................................. G06F 17/60
[52] U.S. Cl. ................................. 705/37; 705/26; 705/27; 705/39
[58] Field of Search ..................... 705/1, 26, 27, 705/35, 37, 38, 39, 44; 395/200.47, 200.49, 200.57; 340/825.26, 825.27, 825.3, 825.31, 825.33

[56] References Cited

U.S. PATENT DOCUMENTS

| | | | |
|---|---|---|---|
| 3,581,072 | 5/1971 | Nymeyer | 705/37 |
| 4,412,287 | 10/1983 | Braddock, III | 705/37 |
| 4,789,928 | 12/1988 | Fujisaki | 705/37 |
| 4,799,156 | 1/1989 | Shavit et al. | 705/26 |
| 4,903,201 | 2/1990 | Wagner | 705/37 |
| 5,077,665 | 12/1991 | Silverman et al. | 705/37 |
| 5,243,515 | 9/1993 | Lee | 705/37 |
| 5,640,569 | 6/1997 | Miller et al. | 395/729 |
| 5,689,652 | 11/1997 | Lupien et al. | 705/37 |

OTHER PUBLICATIONS

Franklin; "Proposed Auction Rules for PCS: The FCC Plans to Use Competitive Bidding, but Exact Procedures are Undefined"; *Cellular Business;* v10 n13; p.18(2); Dec. 1993; DIALOG: File 148, Acc#06787310.

O'Donnell; "Alan's At It Again"; *Bond Buyer;* v309 n29448; p.1(3); Jul. 21, 1994; DIALOG: File 148, Acc#07478152.

Gordon; "Auctions Become High Tech"; *Dealer Business;* v29 n7; p.21(4); Mar. 1995; DIALOG: File 148, Acc#07862519.

Dialog Abstract: File 610, Acc#0489267; "ONSALE Onsale Brings Thrill of Auctions and Bargain Hunting Online; Unique Internet retail service debuts with week-long charity auction for The Computer Museum in Boston", May 24, 1995.

"Onsale Joins Fray as Online Shopping Picks Up Speed: INTERNET BOOMS"; *Computer Reseller News;* Jun. 5, 1995; p. 73; DIALOG: File 16, Acc#05649796.

"Cathay Pacific Airways–USA to Hold First–Ever Internet CyberAuction; CyberTravelers Can Bid for 50 Business Class Round Trips to Hong Kong—No Minimum Bid"; *Business Wire;* p9261084; Sep. 26, 1995; DIALOG: File 148, Acc#08167091.

Siegmann;"Nowhere to Go but Up"; *PC Week;* v12 n42, p.A5(1); Oct. 23, 1995; DIALOG: File 148, Acc#08222496.

Edelson; "Fashion Reevaluates Flickering Fortunes of TV Home Shopping"; *WWD;* v170 n87; p1(3); Nov. 8, 1995; DIALOG: File 148, Acc#08289119.

*Primary Examiner*—Stephen Tkacs
*Attorney, Agent, or Firm*—Luhen Intellectual Property Services

[57] ABSTRACT

A method of conducting an on-line auction that permits individual bidders to pool bids during a bidding session. The auction is conducted over a computer network that includes a central computer, a number of remote computers, and communication lines connecting the remote computers to the central computer. A number of bidding groups are registered in the central computer, each bidding group having a total bid for the item being auctioned. Bids entered from the remote computers are received in the central computer, each bid including a bid amount and a bid designation. Each bid amount is contributed to the total bid of the bidding group indicated by the bid designation. The bidding group having the largest total bid at the end of the bidding session wins the item being auctioned.

20 Claims, 7 Drawing Sheets

ACCOUNT CREATION FORM — 32

BIDDER NAME: — 44 | JOHN SMITH — 54

FINANCIAL ACCOUNT NUMBER: — 46 | 5423 6789 8976 4543

FINANCIAL ACCOUNT TYPE: — 48 | CREDIT CARD

SEND ACCOUNT INFORMATION — 52

BIDDER IDENTIFICATION NUMBER WILL BE ASSIGNED IN A NEW ACCOUNT CONFIRMATION MESSAGE — 56

*FIG. 3*

NEW ACCOUNT CONFIRMATION MESSAGE — 34

44 — BIDDER NAME: | JOHN SMITH — 55

46 — FINANCIAL ACCOUNT NUMBER: | 5423 6789 8976 4543

48 — FINANCIAL ACCOUNT TYPE: | CREDIT CARD

50 — BIDDER ID NUMBER: | 431532

PLEASE CONFIRM YOUR NEW ACCOUNT INFORMATION WITH YOUR ACCOUNT COMPANY — 58

*FIG. 4*

BID ENTRY FORM

CURRENT ITEM:
- GRAPHICAL PICTURE
- DESCRIPTION

SELECT ONE BIDDING GROUP

| NEW YORK ART MUSEUM | LOS ANGELES MUSEUM OF ART | ROMAN CATHOLIC CHURCH |
|---|---|---|
| - TOTAL BID | - TOTAL BID | - TOTAL BID |

| | |
|---|---|
| BIDDER NAME: | JOHN SMITH |
| BIDDER ID NUMBER: | 431532 |
| BID AMOUNT: | $500.00 |
| BID DESIGNATION: | NEW YORK ART MUSEUM |

ENTER BID

CREATE ACCOUNT

*FIG. 6*

METHOD OF CONDUCTING AN ON-LINE AUCTION WITH BID POOLING

BACKGROUND

1. Field of the Invention

The present invention relates to the field of conducting on-line auctions using a computer network, and in particular to a method of conducting an on-line auction that allows individual bidders to pool their bids in real-time during a bidding session.

2. Description of the Prior Art

Auctions provide a popular and exciting marketplace for the buying and selling of property. In particular, auctions are often used to sell highly valued property such as fine art, collectibles, real estate, and luxury items. Traditionally, participation in these high stakes auctions has been exclusively reserved for the extremely wealthy. Many ordinary individuals who would like to participate in the excitement of a high stakes auction are denied access for two reasons.

The first reason is that individual bidders are usually required to attend an auction in person to place a bid on an item for sale. This requirement limits participation in the auction to those people who live near the auction site or those people who can afford the time and expense to travel to the auction site. The second reason is that bidders are required to have sufficient funds to pay for a sale item should they place the winning bid. Because very few people can afford the price of a piece of fine art, bidding is limited to extremely wealthy individuals or to organizations who have raised sufficient funds to pay for a winning bid before the bidding session has begun. Both of these restrictions must be overcome before participation in high stakes auctions can become more widespread.

Many attempts have been made to solve the first problem, gaining bid access to an auction without having to be physically present at an auction site. For example, U.S. Pat. No. 4,789,928 issued to Fujisaki on Dec. 6, 1988 describes an auction information processing system which enables individuals spread over a wide area to participate in an on-line auction. The system includes a host computer connected via communication lines to many remote terminals of individual bidders. The individual bidders enter bids from their remote terminals and the current highest bid and eventual winning bid are displayed in real-time on the remote terminals.

While this system has the advantage of allowing a large number of individual bidders to participate in an on-line auction, it has the disadvantage of not allowing individuals to pool their bids during a bidding session. To win an auction, each bidder must personally have sufficient funds to cover a winning bid. Thus, although this system solves the first problem restricting auction participation, it still limits participation to those individuals who can personally afford the entire purchase price of the item for sale.

Another computerized bidding system is disclosed in U.S. Pat. No. 4,903,201 issued to Wagner on Feb. 20, 1990. Wagner describes an automated futures trading exchange wherein bids to purchase or offers to sell a particular commodity contract are made by exchange members through remote terminals connected to an exchange computer. The exchange computer matches offer, prices and bid prices to complete trading transactions. This system described by Wagner suffers from the same disadvantage of not allowing bidders to pool their bids to buy an item for sale. Additionally, bidders are limited to exchange members, so that the ordinary public is excluded from participating.

Another system for conducting a competitive bidding procedure is disclosed in U.S. Pat. No. 5,243,515 issued to Lee on Sep. 7, 1993. Lee describes a secure teleprocessing bidding system for enabling construction subcontractors to submit bids to a general contractor for a particular construction job. Subcontractors use an ordinary telephone to dial into a central bidding computer and enter their bids. At the close of the bidding session, the central computer prints a summary report of all bids received, and the summary report is mailed or faxed to all participating bidders. As in the previous bidding systems, this system has no mechanism for allowing bidders to pool their bids. Additionally this system suffers from the added disadvantage of not displaying bid information in real-time for bidders to read during a bidding session.

Another teleprocessing system used by QVC Incorporated is described in an article entitled "Fashion Re-Evaluates Flickering Fortunes of TV Home Shopping", WWD, Nov. 8, 1995 V170 N87. Shoppers call from their home phones to order items advertised on their television screens. As the orders are received, QVC tallies how many people have bought each particular sale item. They then display the tally for each item on the viewers, television screens in real-time. This interactive television method of buying an item provides easy remote access to a sale and real-time feedback to buyers. While this method does allow wide audience participation, buyers are not permitted to pool their money to buy an item, so that the sale is limited to relatively low cost items.

Another use of television to sell items is described in an article entitled "Auctions Become High Tech", Dealer Business, Mar. 1995 V29 N7. The article describes an auction system in which an auction company sends a signal via satellite to the televisions of individual car dealers. The dealers view the car for sale on their televisions and bid on the car using a telephone or a remote terminal. Like the previous on-line auction systems, this system offers no mechanism for dealers to pool their bids. Individual bidders must still cover the entire cost of items purchased.

In addition to the on-line auctions mentioned above, several on-line auctions are now being conducted over the Internet. One such auction is described in an article entitled "Cathay Pacific Airways-USA to Hold First Ever Internet CyberAuction" Business Wire, Sep. 26, 1995 p9261084. The article states that Cathay Pacific is auctioning off fifty business class seats from Los Angeles to Hong Kong. Registered bidders submit concealed bids by electronic mail over a two week bidding session. The fifty highest bidders at the close of the bidding session receive an electronic mail message instructing them on how to purchase tickets. This auction system suffers from the same disadvantages of not allowing bid pooling during the bidding session and not displaying bid information to bidders in real-time.

Similarly, Save the Earth Foundation has an Artrock Auction that is described at their world-wide web site http://www.commerce.com/save_earth. To participate in the auction, bidders register and submit bids for auction items through the Internet. Bidders are notified by electronic mail when a bid higher than their own is placed on an item. The winning bidder is also contacted by electronic mail at the close of the bidding session. As in the Cathay Pacific auction, the Artrock Auction has no mechanism to allow bid pooling or to display bid information in real-time.

Auction Web also has on-line auctions, as described at their world-wide web site http://www.ebay.com. In this auction system, bidders also register and submit bids through the Internet. Items for sale are graphically displayed on the bidders' screens, in addition to the bid information for each item. Bid information is updated hourly throughout each two week bidding session. Unfortunately, like the previously mentioned on-line auctions, Auction Web's auction has no mechanism for allowing individual bidders to pool their bids for a particular item during the bidding session.

Similarly, Christie's International describes "Results of the World's First On-Line Auction" at their world-wide web site http://www.christies.com. In Christie's auction, bidders register and submit bids in the same manner as the Auction Web auction. Christie's on-line auction also suffers from the same disadvantage as the Auction Web auction in that it has no mechanism to allow bid pooling by individual bidders during a bidding session.

Thus, no existing on-line auction enables individual bidders to pool their bids during a bidding session. All of the current on-line auctions require each bidder to have sufficient funds to cover a winning bid, severely restricting the number of people who can participate in a high stakes auction. Additionally, not all of the on-line auctions enable bidders to view bid information in real-time, further limiting the excitement of the auction for those few who can afford to participate.

OBJECTS AND ADVANTAGES OF THE INVENTION

Accordingly, it is an object of the present invention to provide a method of conducting an on-line auction that permits individual bidders to pool their bids for a desired item. It is another object of the invention to greatly increase the number of participants in the auction by permitting individual bidders to contribute bids of any size to the total bid of their selected bidding group. It is a further object of the invention to display updated bid information in real-time for bidders to view from their remote computers.

These and other objects and advantages will become more apparent after consideration of the ensuing description and the accompanying drawings.

SUMMARY OF THE INVENTION

The invention presents a method of conducting an on-line auction that permits bid pooling during a bidding session of the auction. The auction is conducted over a computer network that includes a central computer, a number of remote computers, and communication lines connecting the remote computers to the central computer. In the preferred embodiment, the central computer is a world-wide web server and the communication lines are Internet lines that connect bidders at their remote computers to the world-wide web server.

The method includes the step of registering a number of bidding groups in the central computer. Bidding groups can be associations, institutions, museums, or groups formed purely for the purpose of bidding together in order to distribute items by lottery. Each bidding group has a total bid for the item being auctioned. After starting a bidding session, bids entered from the remote computers are received in the central computer. Each of the bids includes a bid amount and a bid designation. The bid designation indicates a chosen group comprising the one bidding group for which the bid is intended.

As a bid is received in the central computer, the bid amount is contributed to the total bid of the chosen group.

In the preferred embodiment, the bidding groups and the total bids are also displayed on the remote computers. Also in the preferred embodiment, the total bids are updated in real-time after each bid amount is added to one of the total bids. The next step in the method is declaring a winning group, the winning group being the one bidding group having the largest total bid at the end of the bidding session.

In a particularly advantageous embodiment, the method also includes the step of creating a bidder account for each bidder in an account creation computer networked to the central computer. Each bidder account includes a bidder name, a bidder identification number, and a financial account number, such as a bidder's credit card or savings account number. In this embodiment, each bid received in the central computer also includes the bidder name and bidder identification number of the person contributing the bid. At the close of a bidding session, each bid contributed to the total bid of the winning group is matched by bidder identification number to a corresponding bidder account. The corresponding bidder account is then charged the bid amount contributed, facilitating collection of the total bid of the winning group.

BRIEF DESCRIPTION OF THE DRAWINGS

FIG. 3 is a sample account creation form appearing on the screen of the remote computer in FIG. 2.

FIG. 4 is a sample confirmation message appearing on the screen of the remote computer in FIG. 2.

FIG. 6 is a sample bid entry form appearing on the screen of the remote computer in FIG. 5.

DESCRIPTION

Figure 1:
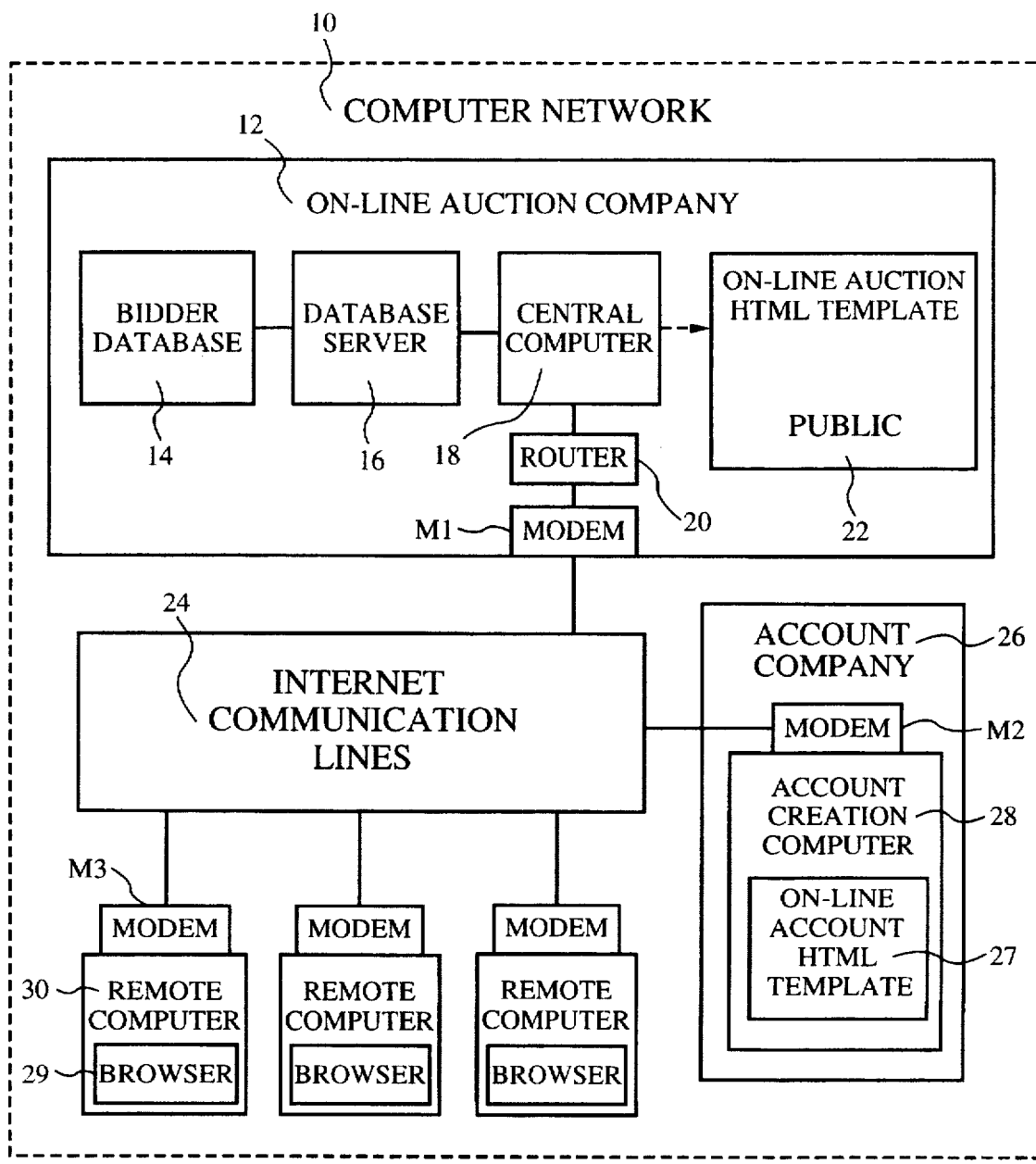
FIG. 1 is a block diagram illustrating the configuration of the computer network according to the method of the invention.

The preferred embodiment of the invention is illustrated in FIGS. 1–10. Referring to FIG. 1, a computer network 10 includes a central computer 18 of an on-line auction company 12. Central computer 18 is connected to a database server 16 serving a bidder database 14, such that database 14 is accessible to central computer 18. Central computer 18 is further networked to a router 20 and a modem M1 for connecting central computer 18 to communication lines 24. In the preferred embodiment, central computer 18 is a world-wide web server machine and communication lines 24 are Internet lines.

Network 10 further includes an account creation computer 28 of an account company 26. Account company 26 is of the type that provides Internet users with a secure account for performing on-line commerce, such as First Virtual Holdings Incorporated located at 11975 El Camino Real, Suite 300, San Diego, Calif. Account creation computer 28 has a modem M2 for connecting account creation computer 28 to communications lines 24.

Network 10 also includes three remote computers 30 each having a modem M3 for connecting remote computers 30 to communication lines 24. For simplicity, only three remote computers 30 are illustrated in FIG. 1. It is obvious that any number of remote computers can be connected to communication lines 24. Further, the preferred embodiment utilizes modems to connect central computer 18, account creation computer 28, and remote computers 30 to communication lines 24. It is obvious to those skilled in the art that many other methods of connection are possible, such as an ethernet connection.

Each remote computer 30 has an Internet browser 29 for displaying web content in the form of Hyper Text Markup Language (HTML). A suitable Internet browser is Netscape 2.0 available from Netscape Corporation located at 501 East Middlefield Road, Mountain View, Calif. Browser 29 allows remote computers 30 to access and display the content of an on-line auction HTML template 22 residing on central computer 18. HTML template 22 contains the main worldwide web pages displayed to on-line auction users on remote computers 30. Similarly, account creation computer 28 has an on-line account HTML template 27 accessible from remote computers 30. In a particularly advantageous embodiment, templates 22 and 27 are Secure HTML templates, and Internet browser 29 is a Secure HTML compliant browser. Using Secure HTML ensures confidentiality for the account and bid transactions that will be described below.

Figure 2:
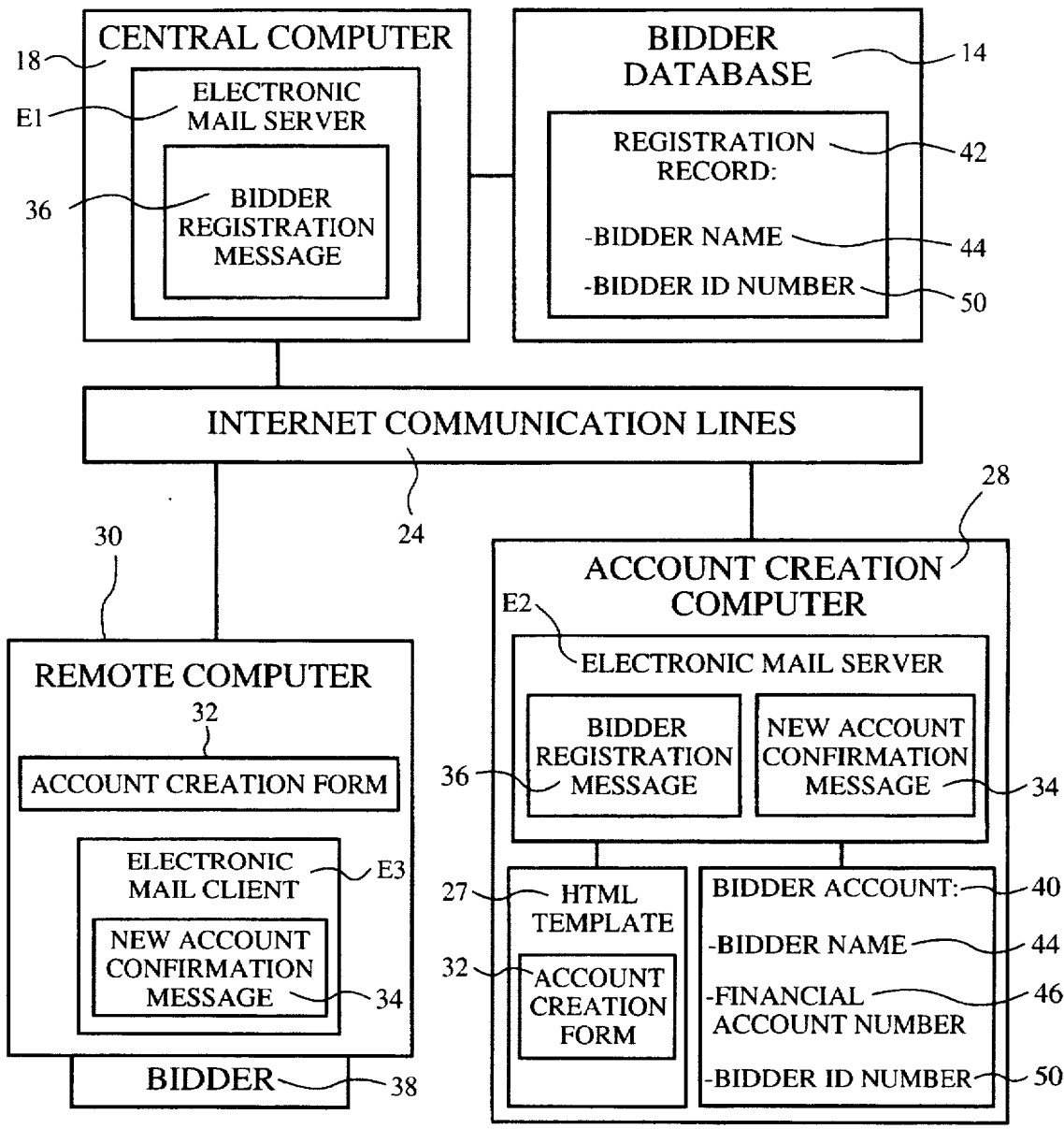
FIG. 2 is a block diagram illustrating the creation of a bidder account according to the method of the invention.

FIG. 2 illustrates in detail the components of central computer 18, account creation computer 28, and remote computer 30 used in the creation of a bidder account 40 and a registration record 42. A bidder 38 at remote computer 30 accesses on-line account HTML template 27 residing on account creation computer 28. Template 27 contains an account creation form 32 which is displayed to bidder 38 on the screen of remote computer 30.

FIG. 3 shows account creation form 32 in detail. Account creation form 32 has three fields 54 corresponding to a bidder name 44, a financial account number 46, and a financial account type 48. In the preferred embodiment, financial account number 46 is a credit card number corresponding to a credit card account of bidder 38. In alternative embodiments, financial account number 46 is the number of a checking account, savings account, or any other account in which bidder 38 has available cash or credit. Account creation form 32 also contains a note 56 advising bidder 38 that a bidder identification number 50 will be assigned in a new account confirmation message 34, as will be described below. Additionally, form 32 contains a button 52 for bidder 38 to press to send form 32 to account creation computer 28 after bidder 38 completes form 32.

Referring again to FIG. 2, account creation computer 28 has an electronic mail server E2 for sending new account confirmation message 34 to bidder 38 at remote computer 30. Remote computer 30 has an electronic mail client E3 for receiving and confirming new account confirmation message 34. FIG. 4 illustrates in detail the appearance of new account confirmation message 34 on the screen of remote computer 30. Message 34 includes four fields 55 corresponding to bidder name 44, financial account number 46, financial account type 48, and bidder identification number 50. Bidder identification number 50 is generated by account creation computer 28 upon receipt of a valid account creation form 32. Message 34 further contains a note 58 advising bidder 38 to confirm the new account information with account company 26.

Referring again to FIG. 2, account creation computer 28 has storage capability for storing a bidder account 40 that includes bidder name 44, financial account number 46, and bidder identification number 50. Additionally, mail server E2 is capable of generating a bidder registration message 36 upon receipt of account confirmation from remote computer 30. Registration message 36 includes bidder name 44 and bidder identification number 50. Central computer 18 has an electronic mail server E1 for receiving registration message 36 from mail server E2. Mail server E1 is linked to bidder database 14 such that a registration record 42 is created in bidder database 14 upon receipt of registration message 36. Registration record 42 includes bidder name 44 and bidder identification number 50.

Figure 5:
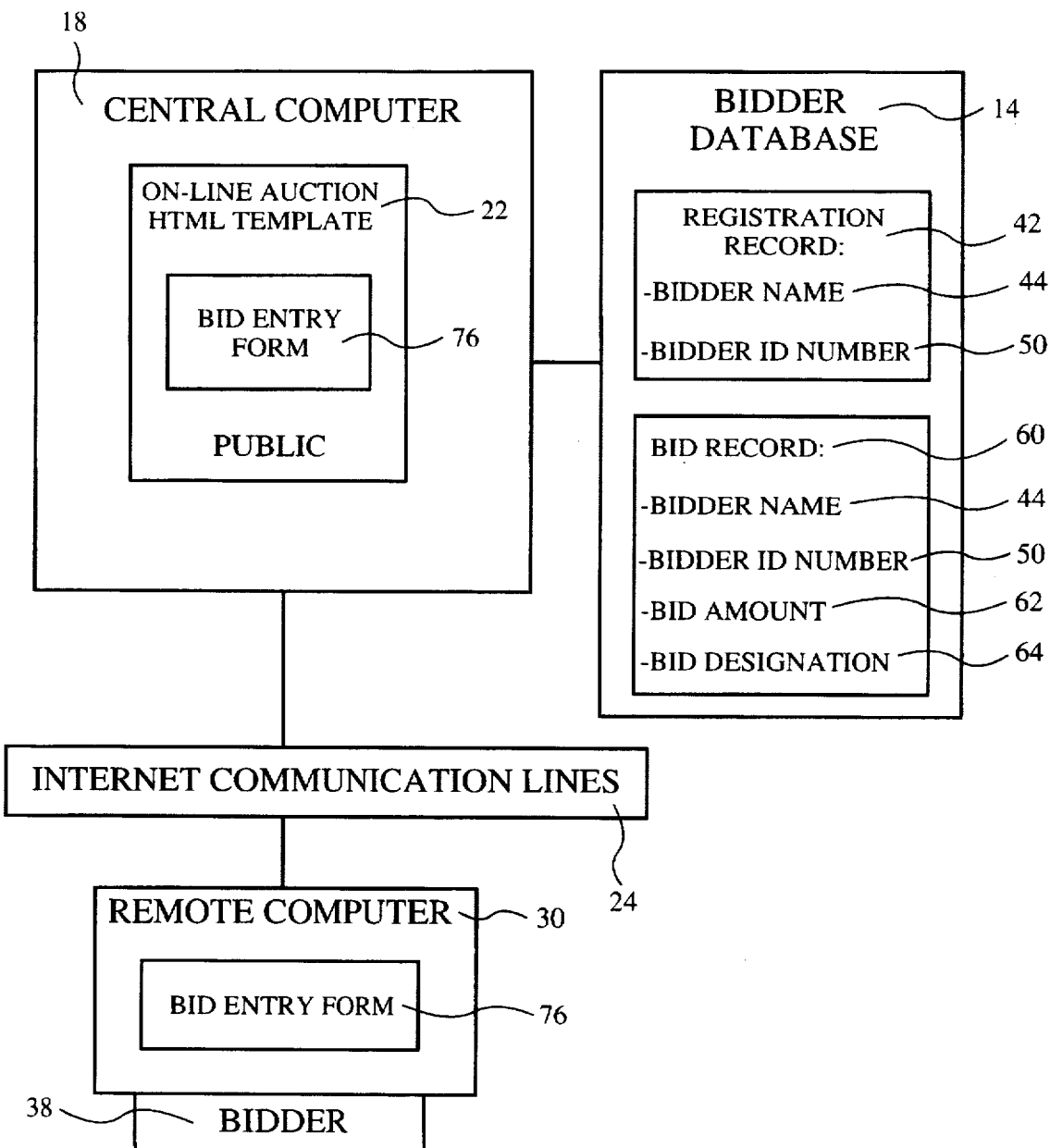
FIG. 5 is a block diagram illustrating the processing of a bid according to the method of the invention.

FIG. 5 illustrates the main components of central computer 18, bidder database 14, and remote computer 30 used to submit and record bids in the on-line auction. On-line auction HTML template 22 residing on central computer 18 contains a bid entry form 76. Bid entry form 76 is displayed on the screen of remote computer 30 when bidder 38 accesses HTML template 22 through communication lines 24.

FIG. 6 illustrates the details of bid entry form 76. Form 76 includes a block 70 showing a graphical picture 72 and a description 74 of a current item being auctioned. Bid entry form 76 also lists three bidding groups 66 each having a total bid 68. For simplicity, only three bidding groups 66 are shown in FIG. 6. It is obvious that more than three bidding groups 66 could be included in the on-line auction. Form 76 further includes four fields 57 corresponding to bidder name 44, bidder identification number 50, bid amount 62, and bid designation 64. Located near fields 57 is an enter bid button 78 and a create account button 80. Enter bid button 78 is for bidder 38 to press to submit bid entry form 76 to central computer 18. Create account button 80 is for bidder 38 to press to connect remote computer 30 to on-line account HTML template 27 residing on account creation computer 28.

Referring again to FIG. 5, central computer 18 is linked to bidder database 14 such that central computer 18 can query registration records 42 stored in bidder database 14. This ensures that when central computer 18 receives bid entry form 76, central computer 18 can verify that bidder name 44 and bidder identification number 50 match an existing registration record 42 in database 14. Central computer 18 and bidder database 14 are further linked such that central computer 18 can store a bid record 60 in database 14. Bid record 60 includes bidder name 44, bidder identification number 50, bid amount 62, and bid designation 64.

Figure 7:
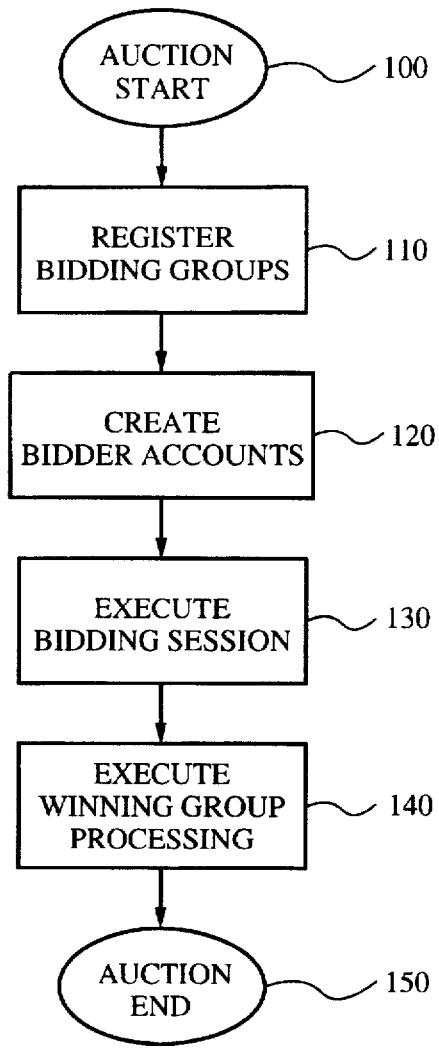
FIG. 7 is a flow chart illustrating the overall flow of an auction according to the method of the invention.
Figure 8:
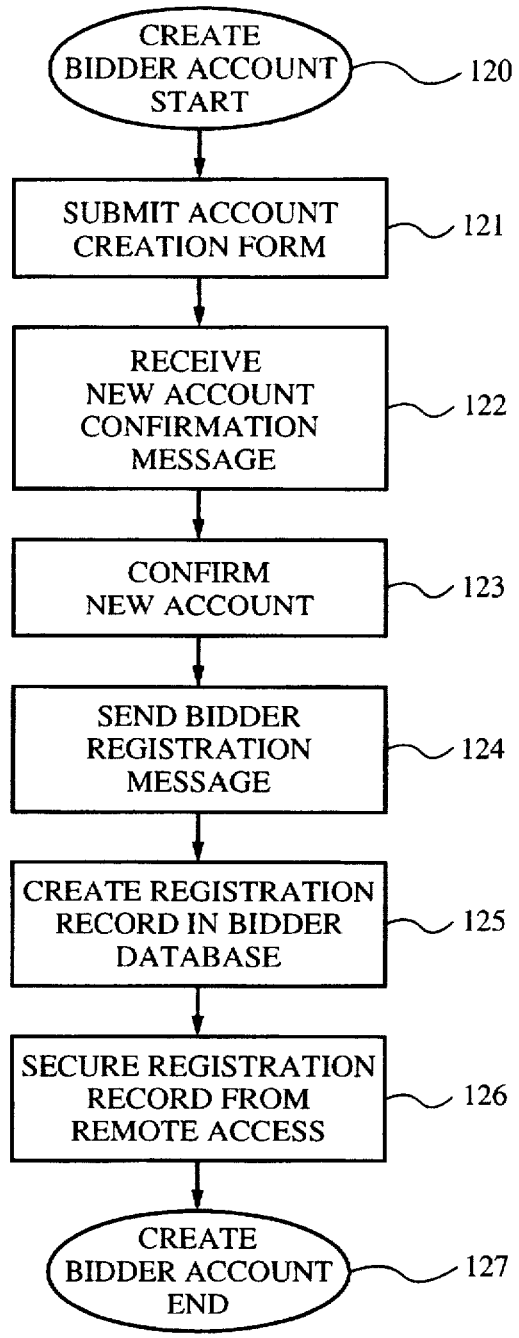
FIG. 8 is a flow chart illustrating the creation of a bidder account (step 120 in FIG. 7).

The operation of the preferred embodiment is illustrated in FIGS. 7–10. FIG. 7 is a flow chart illustrating the overall flow of the on-line auction method beginning at step 100, the on-line auction start. To start the auction, on-line auction company 12 receives graphical picture 72 and description 74 of the current item being auctioned, as well as the names of bidding groups 66 wishing to participate in the auction. Next, in step 110, on-line auction company 12 registers bidding groups 66 in central computer 18. To register bidding groups 66, on-line auction company 12 inserts the name of each bidding group 66 into bid entry form 76 of HTML template 22.

On-line auction company 12 also inserts into bid entry form 76 graphical picture 72 and description 74 of the current item being auctioned. Next, bidders 38 connect their remote computers 30 to central computer 18 through communication lines 24 to access bid entry form 76. When bidders 38 access bid entry form 76, graphical picture 72, description 74, bidding groups 66, and total bids 68 are displayed on their remote computers 30, as shown in FIG. 6.

Next, each bidder 38 creates their own bidder account 40 in account creation computer 28. The creation of bidder account 40 is generally indicated as step 120 in FIG. 7 and detailed in steps 120–127 in FIG. 8. To start the creation of bidder account 40, step 120 in FIG. 8, bidder 38 presses create account button 80 of bid entry form 76. Pressing create account button 80 causes Internet browser 29 to connect remote computer 30 to account creation form 32 contained in HTML template 27. Bidder 38 fills in three fields 54 of account creation form 32 with their bidder name 44, financial account number 46, and financial account type 48, as shown in FIG. 3. Bidder 38 then presses button 52 to send the new account information to computer 28, step 121.

Upon receiving the new account information, account company 26 verifies bidder name 44, financial account number 46, and financial account type 48 to ensure that they correspond to a valid financial account of bidder 38. After successful verification, account creation computer 28 generates bidder identification number 50 for bidder 38. Referring to FIG. 2, account creation computer 28 then generates new account confirmation message 34 on mail server E2 and sends message 34 to mail client E3 of remote computer 30. Bidder 38 then receives new account confirmation message 34 on mail client E3, step 122. Bidder 38 confirms his new account information by pressing button 58 of new account confirmation message 34, step 123.

Upon receiving successful confirmation of the new account information, account creation computer 28 stores bidder account 40 for bidder 38. Account creation computer 28 also generates bidder registration message 36 on mail server E2. Registration message 36 is then sent to mail server E1 of central computer 18, step 124. When central computer 18 receives message 36, central computer 18 creates registration record 42 in bidder database 14, step 125. Registration record 42 is then secured in bidder database 14 from access from remote computers 30, step 126. Securing registration record 42 ensures confidentiality of account information for bidder 38. This ends the account creation process, step 127.

Figure 9:
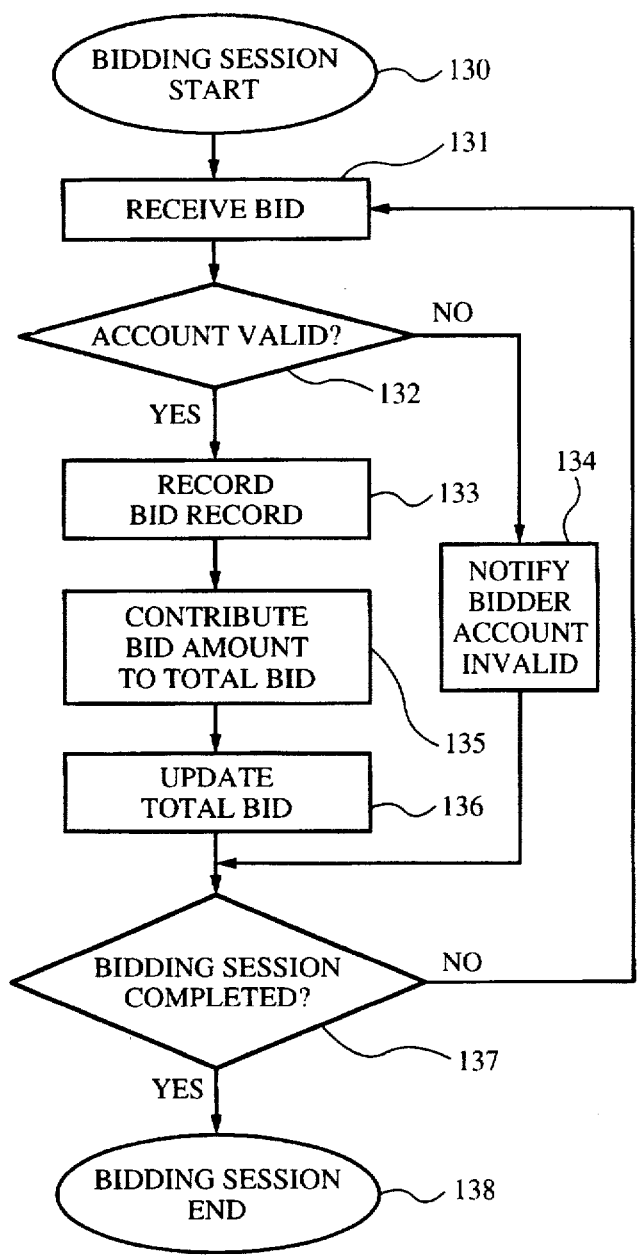
FIG. 9 is a flow chart illustrating the flow of a bidding session (step 130 in FIG. 7).

Following the creation of bidder accounts 40 and registration records 42, on-line auction company 12 starts the bidding session for the auction, which is generally indicated as step 130 in FIG. 7 and detailed in steps 130–138 in FIG. 9. To submit bids, each bidder 38 completes four fields 57 of bid entry form 76 with his bidder name 44, bidder identification number 50, bid amount 62, and bid designation 64, as shown in FIG. 6. Bid amount 62 can be any size desired by bidder 38. Bid designation 64 indicates a chosen group, the chosen group being the one bidding group 66 to which bidder 38 would like bid amount 62 to be contributed. After completing bid entry form 76, bidder 38 presses enter bid button 78 to send the bid information to central computer 18.

Central computer 18 receives bid entry form 76 entered from remote computer 30, step 131. Central computer 18 then queries bidder database 14 to verify that bidder name 44 and bidder identification number 50 received on bid entry form 76 match an existing registration record 42. The query results indicate if bidder 38 has a valid bidder account 40, step 132. If the answer is NO, central computer 18 executes step 134, notifying bidder 38 that he does not have a valid bidder account 40. After notifying-bidder 38, central computer 18 proceeds to step 137, which will be described below.

If the answer is YES, central computer 18 proceeds to step 133, recording bid record 60 in bidder database 14. Bid record 60 includes bidder name 44, bidder identification number 50, bid amount 62, and bid designation 64, as shown in FIG. 5. Next, central computer 18 contributes bid amount 62 to total bid 68 of the chosen group indicated by bid designation 64, step 135. After contributing bid amount 62, central computer 18 updates total bids 68 in real-time, step 136. Changes in total bids 68 are dynamically displayed to bidders 38 by sending commands from HTML template 22 to Internet browser 29. The commands cause browser 29 to update itself so that bidders 38 may view the updated total bids 68 after each bid amount 62 is contributed. Specific techniques of updating browser 29 in this manner are well known in the art.

Next, central computer 18 determines if the bidding session is completed, step 137. If the answer is NO, central computer 18 returns to step 131, receiving another bid entry form 76. If the answer is YES, the bidding session ends, step 138. In the preferred embodiment, the bidding session runs for a pre-defined period of time, such as two weeks, so that central computer 18 can determine if the bidding session is completed by using a chronometer (not shown). A time period of two weeks is used for illustrative purposes only. It is obvious that any duration could be set for the bidding session. In an alternative embodiment, the bidding session runs until bidding activity slows below a pre-defined threshold, such as receiving fewer than three bids per day. Again, this is only an example of a pre-defined threshold. It is obvious that many other thresholds for minimum bidding activity could be set.

Figure 10:
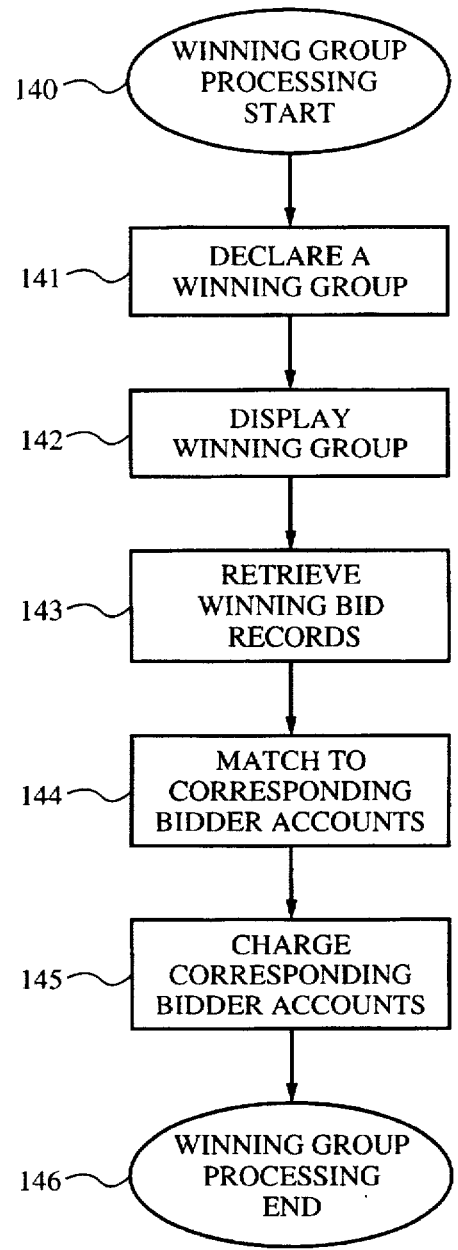
FIG. 10 is a flow chart illustrating the processing of a winning group (step 140 in FIG. 7).

The next step after completing the bidding session is processing a winning group, generally indicated as step 140 in FIG. 7 and detailed as steps 140–146 in FIG. 10. At the end of the bidding session, on-line auction company 12 declares the one bidding group 66 having the largest total bid 68 the winning group, step 141. Next, the winning group is displayed on remote computers 30 for bidders 38 to view, step 142. Then, central computer 18 retrieves winning bid records from bidder database 14, step 143. The winning bid records are those bid records 60 whose bid designation 64 indicates the winning group.

Central computer 18 then sends the winning bid records from mail server E1 to mail server E2 of account company 26. Account company 26 uses bidder name 44 and bidder identification number 50 of each winning bid record to match each winning bid record to a corresponding bidder account 40, step 144. Next, for each winning bid record, account company 26 charges bid amount 62 to financial account number 46 of the corresponding bidder account, step 145. After charging bid amount 62 for each winning bid record, account company 26 transfers the funds generated to on-line auction company 12, ending the winning group processing, step 146. Upon completion of winning group processing, the on-line auction ends, step 150 in FIG. 7.

SUMMARY, RAMIFICATIONS, AND SCOPE

Although the above description contains many specificities, these should not be construed as limiting the scope of the invention but merely as illustrating the presently preferred embodiment. Many other embodiments of the invention are possible. For example, the auction method need not be used only for auctioning an item to a large institution such as the New York Art Museum or Los Angeles Museum of Art. The auction method is also effective for many other applications, such as the promotion of charitable causes.

Charities often hold fund raising auctions in which they sell valuable items which have been donated to the charity. The auction method presented increases the amount of funds a charity raises in these auctions for two reasons. First, it greatly increases the number of participants by allowing easy on-line access to the auction. Second, it increases the sale price by allowing ordinary individuals, in addition to wealthy individuals, to contribute to the total bid, expanding the pool of available funds. In one possible embodiment, competitive bidding groups are formed, each bidding group representing a different charitable cause. Each bid contributed to a bidding group helps the respective charity, but only the winning group is awarded the item being auctioned. The winning group then holds a lottery to determine which one of the contributing bidders gets to keep the item.

Further, the on-line auction method described need not be conducted over the Internet using a world-wide web server machine. The method is just as effective using any computer network that allows the transmission of data between bidders at remote locations and a central processor. Similarly, modems are not necessary to network the central computer, account creation computer, and remote computers. Many other methods of connection are possible, such as ethernet connections, or dedicated communication lines.

For simplicity of understanding, the drawings and description show only three remote computers and three bidding groups. Obviously, for a high stakes auction, many more bidding groups will be registered and many more remote computers will be connected to the network. Also for simplicity of understanding, the steps of registering bidding groups and creating bidder accounts are presented before the step of starting a bidding session. This is for illustrative purposes only, as bidding groups may be registered in the central computer after the commencement of a bidding session. Bidders wishing to participate in the auction but not wishing to bid with any of the current bidding groups may form a new bidding group during the bidding session. Similarly, bidders can create bidder accounts during the bidding session if they desire to bid on the current item being auctioned.

Therefore, the scope of the invention should be determined, not by examples given, but by the appended claims and their legal equivalents.

I claim:

1. A method of conducting an auction using a computer network, said computer network comprising a central computer, a plurality of remote computers, and a plurality of communication lines connecting said remote computers to said central computer, said method comprising the following steps:
   a) registering a plurality of bidding groups in said central computer, each of said bidding groups having a total bid;
   b) receiving in said central computer bids entered from said remote computers, each of said bids comprising a bid amount and a bid designation, said bid designation indicating a chosen group comprising one of said bidding groups for which said bid is intended;
   c) contributing said bid amount to said total bid of said chosen group; and
   d) declaring a winning group, said winning group being the one bidding group having the largest total bid at the end of said bidding session.

2. The method of claim 1, wherein said communication lines comprise internet lines, said central computer comprises a world-wide web server, and said remote computers are connected to said world-wide web server through said internet lines.

3. The method of claim 1, further comprising the step of displaying on said remote computers a graphical picture and a description of a current item being auctioned.

4. The method of claim 1, further comprising the steps of displaying said bidding groups and said total bids on said remote computers and updating said total bids in real-time after each of said bid amounts is added to one of said bid totals.

5. The method of claim 1, further comprising the step of creating bidder accounts in an account creation computer networked to said central computer, each of said bidder accounts comprising a bidder name, a bidder identification number, and a financial account number.

6. The method of claim 5, wherein said bidder accounts are created by bidders from said remote computers prior to said bidders entering said bids.

7. The method of claim 5, further comprising the step of creating registration records in a bidder database accessible to said central computer, each of said registration records comprising said bidder name and said bidder identification number.

8. The method of claim 7, further comprising the step of securing said registration records in said bidder database from access by said remote computers.

9. The method of claim 7, further comprising the steps of:
   a) receiving in said central computer said bidder name and said bidder identification number with each of said bids;
   b) verifying that said bidder name and said bidder identification number match an existing registration record in said bidder database prior to adding said bid amount to said total bid; and
   c) recording a bid record in said bidder database, said bid record comprising said bidder name, said bidder identification number, said bid amount, and said bid designation.

10. The method of claim 9, further comprising the steps of:
   a) retrieving from said bidder database winning bid records comprising said bid records whose bid designation indicates said winning group;
   b) matching each of said winning bid records to a corresponding bidder account; and
   c) charging said corresponding bidder account the bid amount stored in said winning bid record.

11. A method of bid pooling during a bidding session of an auction, said auction being conducted over a computer network, said computer network comprising a central computer, a plurality of remote computers, and a plurality of communication lines connecting said remote computers to said central computer, said method comprising the following steps:
   a) registering a plurality of bidding groups in said central computer, each of said bidding groups having a total bid;
   b) receiving in said central computer bids entered from said remote computers, each of said bids comprising a bid amount and a bid designation, said bid designation indicating a chosen group comprising one of said bidding groups for which said bid is intended; and
   c) contributing said bid amount to said total bid of said chosen group.

12. The method of claim 11, wherein said communication lines comprise internet lines, said central computer comprises a world-wide web server, and said remote computers are connected to said world-wide web server through said internet lines.

13. The method of claim 11, further comprising the step of displaying on said remote computers a graphical picture and a description of a current item being auctioned.

14. The method of claim 11, further comprising the steps of displaying said bidding groups and said total bids on said remote computers and updating said total bids in real-time after each of said bid amounts is added to one of said total bids.

15. The method of claim 11, further comprising the steps of creating bidder accounts in an account creation computer networked to said central computer, each of said bidder accounts comprising a bidder name, a bidder identification number, and a financial account number.

16. The method of claim 15, wherein said bidder accounts are created by bidders from said remote computers prior to said bidders entering said bids.

17. The method of claim 15, further comprising the step of creating registration records in a bidder database accessible to said central computer, each of said registration records comprising said bidder name and said bidder identification number.

18. The method of claim 17, further comprising the step of securing said registration records in said bidder database from access by said remote computers.

19. The method of claim 17, further comprising the steps of:

a) receiving in said central computer said bidder name and said bidder identification number with each of said bids;

b) verifying that said bidder name and said bidder identification number match an existing registration record in said bidder database prior to adding said bid amount to said total bid; and c) recording a bid record in said bidder database, said bid record comprising said bidder name, said bidder identification number, said bid amount, and said bid designation.

20. The method of claim 19, further comprising the steps of:

a) declaring a winning group comprising the bidding group having the largest total bid at the end of said bidding session;

b) retrieving from said bidder database winning bid records comprising said bid records whose bid designation indicates said winning group;

c) matching each of said winning bid records to a corresponding bidder account; and d) charging said corresponding bidder account the bid amount stored in said winning bid record.

* * * * *